April 29, 1952  E. M. THOMAS  2,594,698

NOVELTY DEVICE IN NATURE OF VIEWING MEANS

Filed Sept. 6, 1949

INVENTOR.
Emory M. Thomas
BY
ATTORNEY

Patented Apr. 29, 1952

2,594,698

UNITED STATES PATENT OFFICE 2,594,698

NOVELTY DEVICE IN NATURE OF VIEWING MEANS

Emory M. Thomas, Independence, Mo.

Application September 6, 1949, Serial No. 114,192

1 Claim. (Cl. 88—1)

This invention relates to the field of novelties and particularly those designed purely for amusement of the user and those who watch the performance of such user, the primary aim being to provide a viewing device taking the form of a pair of spectacles, although having no effect from the standpoint of correction of vision, and having a particularly formed lens or lenses whereby to produce distorted and unusual visual effects. It is the most important object of the present invention to provide a novelty device in the form of spectacles wherein the lenses are prismatic and of course transparent all to the end that as the user looks therethrough, weird, peculiar and distorted images are reflected within the range of vision to the amusement of such user.

Another important object of the present invention is to provide a device as aforementioned wherein those watching the user of the device are also amused because of the uniqueness and comical appearance of the eyes of the user through the prismatic lens.

A still further object of the invention hereof is to provide a spectacle-like device, wherein the lens or lenses are rotatable whereby differing effects are produced, depending upon the position of the lens. More minor objects will be made clear or become apparent as the following specification progresses, reference being had to the accompanying drawing wherein—

Figure 1:
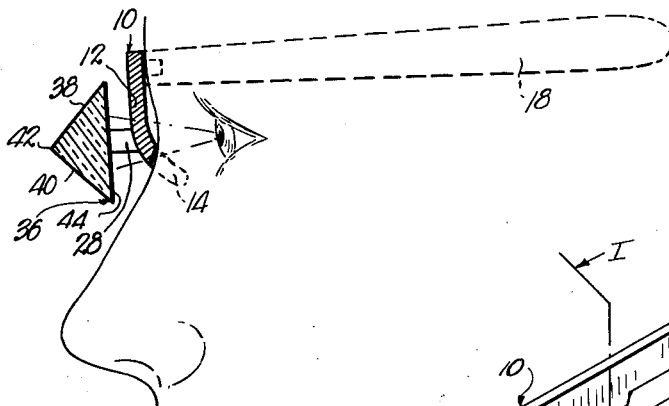
Fig. 1 is a transverse cross-sectional view of a novelty device in the nature of viewing means made in accordance with the present invention, said section being taken on line I—I of Fig. 2.
Figure 2:
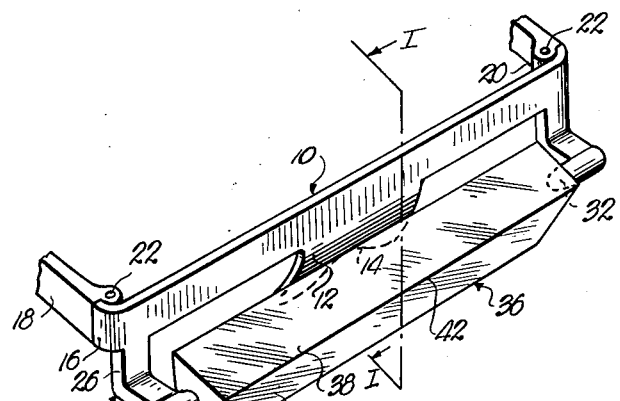
Fig. 2 is a fragmentary perspective view thereof.

The form of the invention shown in Figs. 1 and 2 constitutes an elongated frame, broadly designated by the numeral 10, having a downwardly and rearwardly standing bridge 12, integral therewith and midway between its ends. Bridge 12 is bifurcated to present a curved notched portion 14, adapted to fit over the bridge of the nose of the wearer as shown in Fig. 1, and as is common in spectacles and eye pieces generally.

The outermost free ends of the frame piece 10, are curved rearwardly as at 16 to bifurcately receive side pieces 18, that are adapted to pass over and rest upon the ears of the wearer. That end of the end pieces 18, adjacent the frame 10 is bifurcated to receive boss 20 on curved portion 16, and a pivot pin 22, passing through the bifurcations of side pieces 18, and the boss 20 serves to swingably mount the side pieces 18 to the frame piece 10.

Frame 18 is also provided with an integral L-shaped bracket, broadly designated by the numeral 24, there being a bracket 24 at each end of frame piece 10, adjacent curved portions 16. One leg 26, of the bracket 24 extends downwardly from the lowermost edge of frame 10 and perpendicular to the longitudinal axis of the latter. Another leg 28 of the bracket 24 projects outwardly and forwardly from the lowermost end of leg 26 and perpendicular to the latter. The outermost free end of the leg 28 is cast, or otherwise formed integrally therewith and elongated boss 30 that is circular in cross-section, and projects inwardly beyond the leg 28 in a pintle portion 32. Portion 32 is substantially dome shaped and is received by a complementary cavity 34 formed in an elongated transparent prismatic lens, broadly designated by the numeral 36. Lens 36 has a pair of plane faces 38 and 40 that are flat throughout their lengths and rectangular. The faces 38 and 40 converge as one longitudinal edge thereof is approached into a straight prism edge 42. A third plane face, also rectangular and designated by the numeral 44, joins the two faces 38 and 40. Thus, the solid lens 36 is triangular shaped in cross-section, as is clearly illustrated both in Figs. 1 and 2, of the drawing. Because of the fact that the ends 32 of boss 30 journaled in cavities 34 that are formed in the two ends of lens 36, the latter is rotatable on its longitudinal axis between the brackets 24.

Sufficient clearance is provided to permit such rotation of lens 36 without contacting the bridge portion 12 of the frame 10, and it is desirable that the cavity 34 be centrally disposed on the ends of lens 36.

Figure 3:
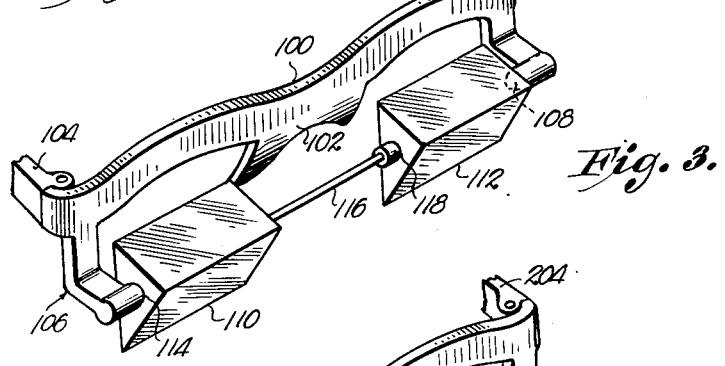
Fig. 3 is a fragmentary perspective view showing another modification of the device and Fig. 4 is a fragmentary perspective view showing a third modified form of the novelty device.

The modification shown in Fig. 3 is identical with that of Figs. 1 and 2, from the standpoint of providing a frame 100, a bridge 102, a pair of side pieces 104 pivotally secured to the frame 100 and brackets 106 integral with frame 100, having bosses thereon that are provided with pintle ends 108. In lieu however, of a single elongated lens as at 36, in Figs. 1 and 2, a pair of lens 110 and 112 are provided. One end of each lens 110 and 112 has a cavity 114 for pivotally receiving a proximal pintle 108. The length of each lens 110 and 112 is slightly less than the distance between bridge 102 and each bracket 106. Lenses 110 and 112 are interconnected by means of an elongated rod 116 that passes through a fixture 118 on the innermost end of each lens 110 and 112 respectively. The fixtures 118 may be imbedded within the lenses if desired and may serve as a means of either rigidly securing rod 116 to the lenses 110 and 112, or may be formed in the nature of a bearing to permit relative rotation of lens 110 with respect to lens 112. In any event, the rod 116 is in coaxial alignment with the pintle 108.

Figure 4:
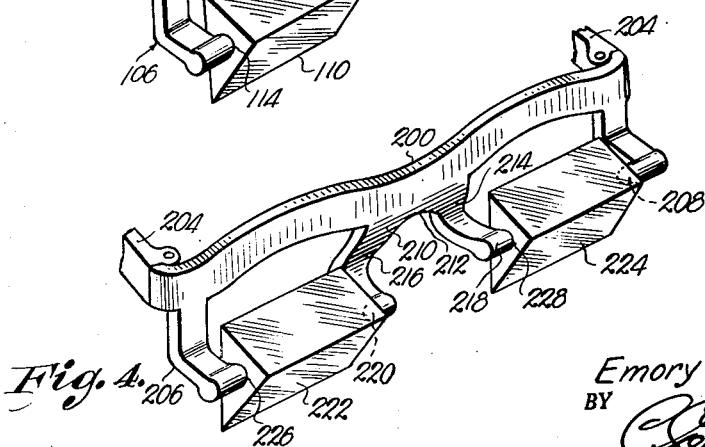

The form of my invention, illustrated in Fig. 4 is substantially the same as that of Fig. 3. There is provided a frame 200, having side pieces 204 pivotally secured thereto in much the same manner as described with respect to side pieces 18. Frame 200 is likewise provided with brackets 206, taking precisely the same form as those of Figs. 1 and 2, as well as Fig. 3. Each bracket 206 has a boss provided with a pintle 208. A bridge or nose piece 210 integral with frame 200, differs slightly from the nose piece 12 and 102 in that there is an arcuate notch 212 for receiving the nose of the user and a pair of downturned legs 214 that project at their lowermost ends outwardly and forwardly into a pair of arms 216. Arms 216 extend in the same direction as the horizontal leg of the brackets 206 and are spaced apart from each other as well as from the proximal bracket 206. The outermost free ends of each arm 216 is provided with a boss 218 that is in turn provided with a pintle 220. The pintles 220 extend inwardly toward the proximal pintle 208. A pair of lens 222 and 224, taking the same form as lens 110 and 112 are pivotally mounted between one bracket 206 and one arm 216. Cavities 226 and 228, in the lenses 222 and 224 receive pintles 208 and 220 respectively. The lenses 222 and 224 are thus separately rotatable on their longitudinal axis, said axis being in coaxial alignment.

Obviously all of the lenses 110, 112, 222, and 224 are solid, transparent and triangular in cross-section in the same manner as above described, with respect to lens 36. The novelty device above described, whether the same takes the form of that shown in Figs. 1 and 2, or that illustrated in Fig. 3, or the form of Fig. 4 is used in precisely the same manner as a pair of spectacles. One of the plane faces of the prismatic lens or lenses is disposed vertically before the eyes of the user in the manner illustrated in Fig. 1. As the wearer looks through the lens or lenses, images within his line of vision are reflected in a somewhat distorted fashion. A three-dimensional effect will, in some cases be produced and in other cases, a weird appearance with horizontal lines as well as vertical lines, being curved instead of straight as would appear if the device were not being used.

The prismatic effect, or color spectrum will also be present under normal conditions and a normal eye will be able to see a multiplicity of series of colors not visible without the use of the device hereof. From the standpoint of those watching the novelty device being used, the user will appear to have a multiplicity of superimposed eyes, all of which are weird and monsterlike which will of course lend to amusement and fun-making.

All of the above effects will vary in accordance with the rotative position of the lens or lenses and in the case of separately rotatable lens, one lens may be rotated to a position differing from the position of the other lens, adding further to the distortion with respect to horizontal and vertical alignment of reflected images. From a standpoint of shapeness of construction and durability it is contemplated that the lenses be made from a suitable clear plastic but other materials might be well used if desired. The particular form of the supporting means for the lenses are of no particular significance and the drawings illustrates how changes might be made by including decorative curves as shown in Figs. 3 and 4, as distinguished from the straight line pattern of the frame chosen for illustration in Fig. 2.

Many other details of construction and changes may be made within the spirit of this invention, and therefore, it is desired to be limited only by the scope of the appended claim.

Having thus described the invention, what is claimed as new and desired to be secured by Letters Patent is:

A viewing device in the nature of spectacles comprising a frame having a bridge adapted to be supported by the nose of a wearer; a pair of solid, transparent, elongated prismatic lenses each lens being triangular in cross-section presenting three plane faces and three elongated straight edges; a pair of spaced L-shaped brackets for each lens respectively and on each side respectively of said bridge, each bracket having a leg depending from the frame and a second leg extending outwardly from the lowermost end of the depending leg; means for each lens respectively for pivotally mounting the same to the corresponding second legs for rotative movement on the longitudinal axes of the lenses, the axes of rotation of the lenses being aligned; and a pair of side pieces on the frame extending laterally therefrom oppositely from the said second legs of the brackets for passing over the ears of said wearer.

EMORY M. THOMAS.

REFERENCES CITED

The following references are of record in the file of this patent:

UNITED STATES PATENTS

| Number | Name | Date |
| --- | --- | --- |
| 301,562 | Butler | July 8, 1884 |
| 1,691,789 | Teiber | Nov. 13, 1928 |
| 1,905,675 | Baker | Apr. 25, 1933 |
| 2,123,682 | Wingate | July 12, 1938 |
| 2,396,510 | Hulst | Mar. 12, 1946 |
| 2,535,321 | Rooney | Dec. 26, 1950 |

FOREIGN PATENTS

| Number | Country | Date |
| --- | --- | --- |
| 29,167 | France | Mar. 3, 1925 |

(Addition to No. 570,625)